United States Patent
Hung et al.

(10) Patent No.: US 9,227,503 B1
(45) Date of Patent: Jan. 5, 2016

(54) ELECTRIC POWER SPLIT HYBRID SYSTEM

(71) Applicant: National Taiwan Normal University, Taipei (TW)

(72) Inventors: Yi-Hsuan Hung, Taipei (TW); Cheng-Ta Chung, Huwei Township, Yunlin County (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 14/507,804

(22) Filed: Oct. 6, 2014

(30) Foreign Application Priority Data

Jun. 13, 2014 (TW) .............................. 103120588 A

(51) Int. Cl.
*B60K 6/442* (2007.10)
*B62K 11/00* (2006.01)
*B62M 23/02* (2010.01)
*B60K 6/40* (2007.10)
*B60K 6/383* (2007.10)

(52) U.S. Cl.
CPC ................. *B60K 6/442* (2013.01); *B60K 6/383* (2013.01); *B60K 6/40* (2013.01); *B62K 11/00* (2013.01); *B62M 23/02* (2013.01); *Y10S 903/951* (2013.01)

(58) Field of Classification Search
CPC ............ B60K 6/22; B60K 6/36; B60K 6/365; B60K 6/38; B60K 6/383; B60K 6/44; B60K 6/442; B60K 6/48; B62M 23/02
See application file for complete search history.

(56) References Cited

U.S. PATENT DOCUMENTS

| | | | | |
|---|---|---|---|---|
| 5,309,778 A | * | 5/1994 | Antonov | 74/15.86 |
| 5,433,282 A | * | 7/1995 | Moroto et al. | 180/65.21 |
| 6,109,127 A | * | 8/2000 | Liau | 74/336 B |
| 2002/0148659 A1 | * | 10/2002 | Bordini | 180/65.2 |
| 2002/0173391 A1 | * | 11/2002 | Endo et al. | 474/18 |
| 2003/0094317 A1 | * | 5/2003 | Takizawa et al. | 180/53.8 |
| 2004/0251862 A1 | * | 12/2004 | Imai | 318/376 |
| 2005/0257974 A1 | * | 11/2005 | Nakagawa et al. | 180/68.5 |
| 2006/0289214 A1 | * | 12/2006 | Katsuhiro et al. | 180/65.4 |
| 2009/0205886 A1 | * | 8/2009 | Supina et al. | 180/65.22 |
| 2010/0204002 A1 | * | 8/2010 | Borgerson | 475/292 |

* cited by examiner

*Primary Examiner* — Frank Vanaman
(74) *Attorney, Agent, or Firm* — Cheng-Ju Chiang

(57) ABSTRACT

An electric power split hybrid system comprises a case, a linkage unit, an electric power part, and a switching part. An engine, a generator, a motor, and a transmission mechanism are installed in the case. The generator is used to start the engine, and is capable of adjusting a torque of the engine and of generating electricity via driving of the engine. The transmission mechanism is used to link and move a wheel to rotate. The linkage unit is used to link and move the engine and the motor. The electric power part is used to store electrical energy generated by the generator and to supply electric power to the motor. The switching part is connected to the generator, the motor, and the electric power part. Electric power generated by the generator is switched by the switching part to supply to one of the motor and the electric power part.

3 Claims, 4 Drawing Sheets

ELECTRIC POWER SPLIT HYBRID SYSTEM

BACKGROUND OF THE INVENTION

1. Field of the Invention

The present invention relates to an electric power split hybrid system, particularly with regard to an electric power split hybrid system with a switching part. The electric power split hybrid system has advantages and effectiveness of extending battery life and reducing a battery volume to enhance overall fuel economic benefit.

2. The Related Arts

In general, hybrid motorcycles can now be switched to one of two modes of an electric driving mode (by a motor) and a fuel-driven mode (by an engine). Only one of the two modes is utilized to drive motorcycles at one time. Hence, there are still the following disadvantages.

[1] Shorter battery life and larger battery volume. Generally, the battery life is calculated based on times of charging and discharging. In the electric driving mode, electric power of the motor is supplied by the battery completely. Therefore, when the electric driving mode is used more frequently, the number of charging and discharging the battery increases dramatically. As a result, a life of such battery is naturally shortened. Besides, in order to maintain a driving ability for certain distances, the battery in design also needs to have an adequate electrical quantity, and in return, the battery will have a relatively larger volume. Based on a current trend of energy saving in the world, a battery with a short battery life and a larger battery volume is apparently hard to be accepted by the current market.

[2] Lower fuel economy benefit. In general, when an engine is maintained to run under a medium-speed high-efficiency status, its fuel economy benefit can reach the best. However, when ordinary hybrid motorcycles are switched to their fuel-driven mode, the engine drives motorcycles individually, and a rotational velocity of wheels changes together with a rotational velocity of the engine. Therefore, usage of the engine varies based on user's required speeds. A medium-speed high-efficiency status of the engine cannot be maintained all the time, and failure of maintaining results in a lower fuel economy benefit.

SUMMARY OF THE INVENTION

The main objective of the present invention is to provide an electric power split hybrid system which has advantages and effectiveness of extending battery life and reducing a battery volume to enhance overall fuel economic benefit, and so on, in order to solve the above mentioned problems of prior techniques, i.e., having a shorter battery life and a large battery volume, and a lower fuel economy benefit, and so on.

The technical means adopted and used in the present invention for solving the problems depicted above is to provide an electric power split hybrid system, comprising:

a case;

a first one-way clutch, which is fixed to the case and is capable of being set in a locked state and in a disengaged state, respectively;

a second one-way clutch, which is fixed to the case and is capable of being set in a locked state and in a disengaged state, respectively;

an engine;

a generator, which is used to start the engine, and is capable of adjusting a torque of the engine and of generating electricity via driving of the engine;

a motor;

a transmission mechanism, which is used to link and move a wheel to rotate;

a linkage unit, which comprises a transmission element, a driving wheel group, and a passive wheel group, the driving wheel group being connected to the engine, the transmission element is used to link the driving wheel group and the passive wheel group to each other for consecutive movement;

a planetary gear frame set, which comprises a planetary frame, a plurality of planetary gears, a ring gear, and a sun gear, the planetary frame being connected to the passive wheel group and the first one-way clutch, the plurality of planetary gears being installed and pivoted to the planetary frame and each of the plurality of planetary gears being respectively engaged with the ring gear and the sun gear, the ring gear being connected to the transmission mechanism, the sun gear being connected to the second one-way clutch and the motor;

an electric power part, which is used to store electrical energy generated by the generator and to supply electric power to the motor;

a switching part, which is connected to the generator, the motor, and the electric power part, electric power generated by the generator being switched by the switching part to supply to one of the motor and the electric power part.

The above objects and advantages of the present invention are easy to understand in depth from the following detailed description and the accompanying drawings for the below chosen embodiments of the present invention.

The present invention will be explained and depicted in details hereinafter via the following embodiments and drawings.

DETAILED DESCRIPTION OF PREFERRED EMBODIMENT

Figure 1:
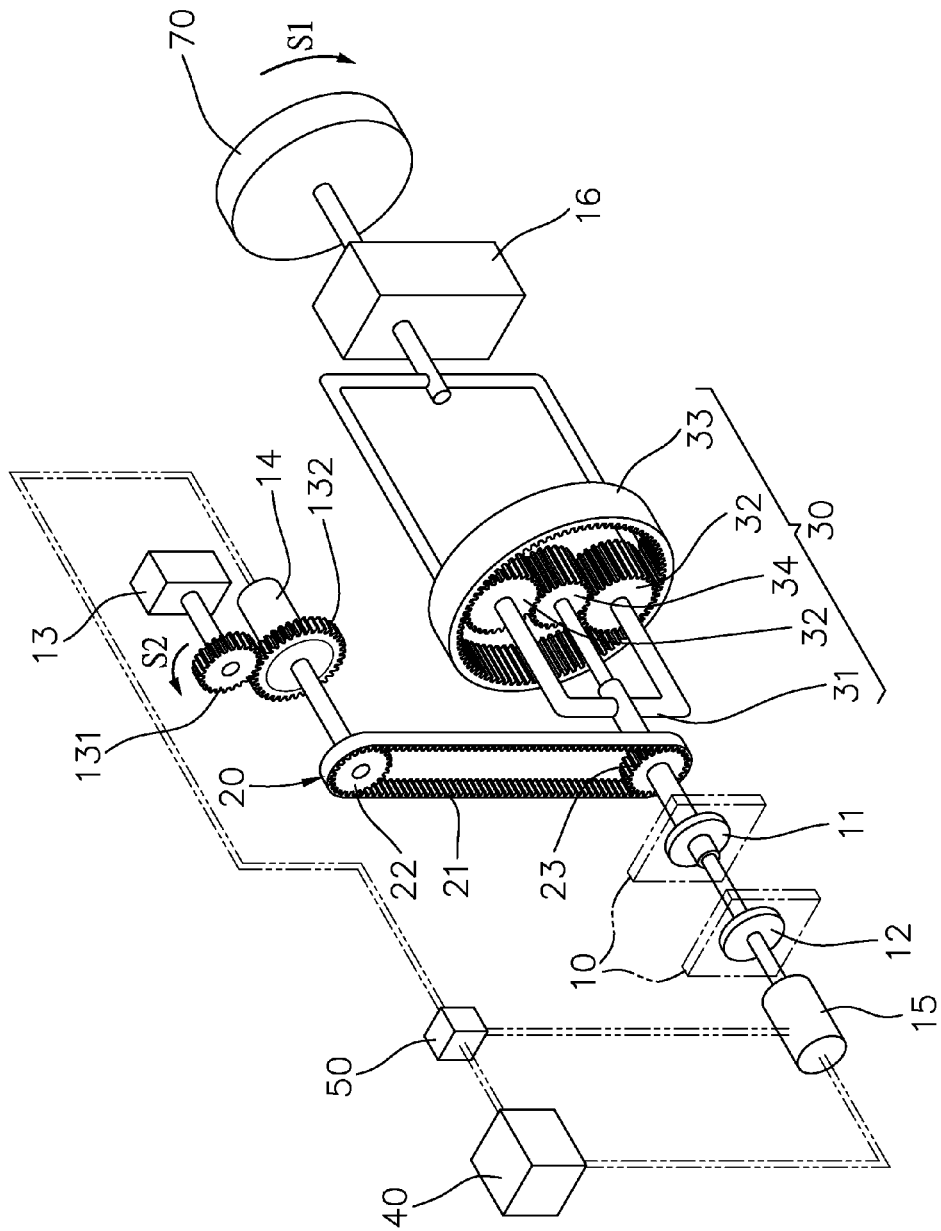
FIG. 1 shows a schematic exploded perspective view of an electric power split hybrid system in accordance with the present invention.
Figure 2:
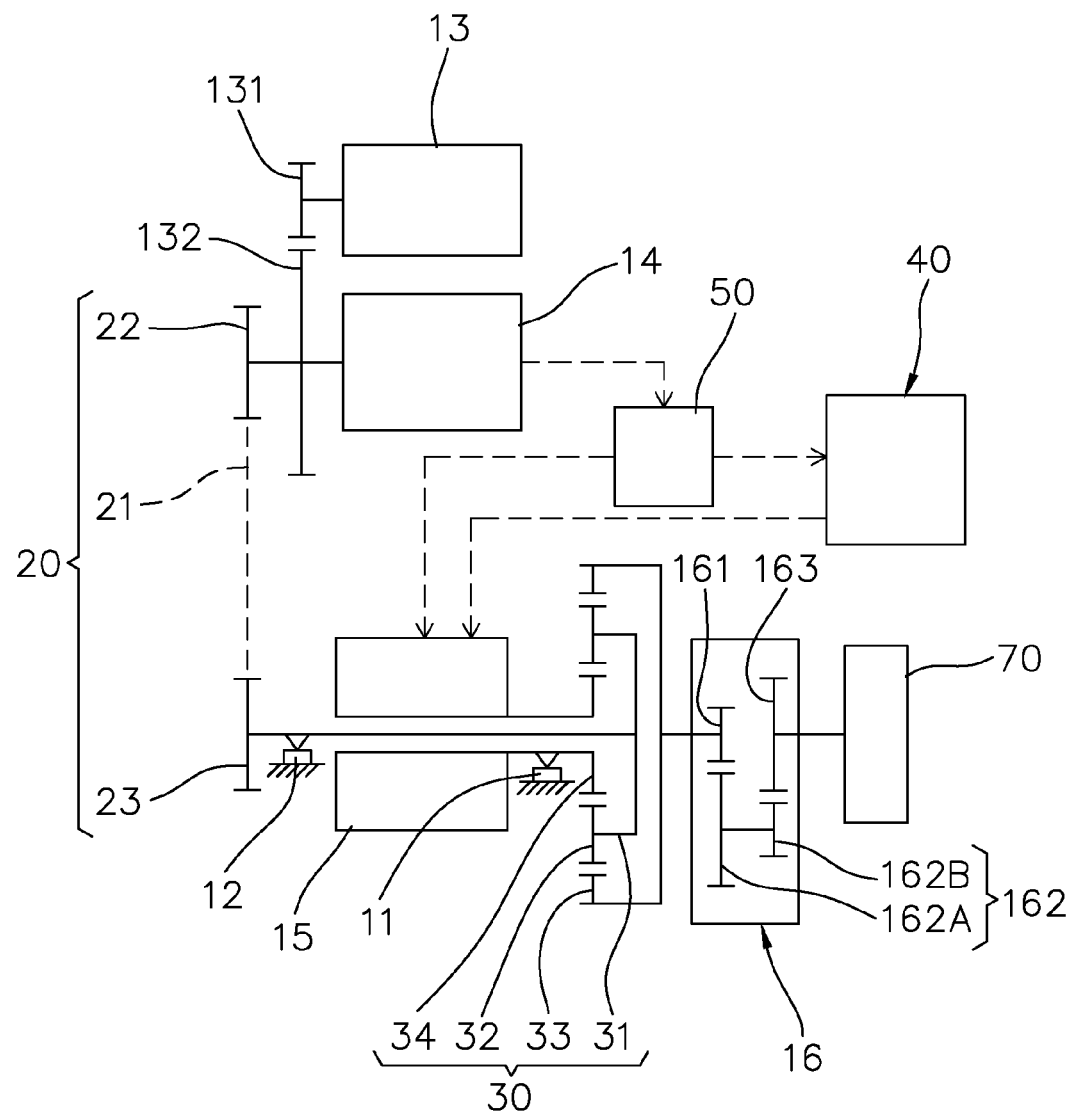
FIG. 2 shows a schematic linkage diagram of the electric power split hybrid system in accordance with the present invention.

With reference to FIGS. 1 and 2, an electric power split hybrid system of the present invention comprises a case 10, a first one-way clutch 11, a second one-way clutch 12, an engine 13, a generator 14, a motor 15, a transmission mechanism 16, a linkage unit 20, a planetary gear frame set 30, an electric power part 40, and a switching part 50.

The first one-way clutch 11 and the second one-way clutch 12 are fixed to the case 10, and are capable of being set in a locked state and in a disengaged state, respectively. In particular, when the first one-way clutch 11 and the second one-way clutch 12 are disengaged from each other in the disengaged state, they may limit their connective devices for unidirectional rotation of the connective devices, and a rotation direction can be adjustable (i.e., limiting to either forward rotation or backward rotation).

The engine 13 comprises a first linkage part 131 and a second linkage part 132, and the first linkage part 131 and the second linkage part 132 are linked to each other for consecutive movement. The engine 13 drives the first linkage part 131 to rotate, and the first linkage part 131 consecutively drives the second linkage part 132 to rotate.

The generator 14 is used to start the engine 13, and is capable of adjusting a torque of the engine 13 and of generating electricity via driving of the engine 13.

The transmission mechanism 16 is used to link and move a wheel 70 to rotate.

The linkage unit 20 comprises a transmission element 21, a driving wheel group 22, and a passive wheel group 23. The driving wheel group 22 is connected to the engine 13, and the transmission element 21 is used to link the driving wheel group 22 and the passive wheel group 23 to each other for consecutive movement. The second linkage part 132 of the engine 13 is connected to the generator 14 and the driving wheel group 22. In other words, when the engine 13 starts, the first linkage part 131 drives the second linkage part 132 to rotate, and the second linkage part 132 drives the generator 14 to generate electricity and drives the driving wheel group 22 to rotate.

The planetary gear frame set 30 comprises a planetary frame 31, a plurality of planetary gears 32, a ring gear 33, and a sun gear 34. The planetary frame 31 is connected to the passive wheel group 23 and the first one-way clutch 11. The plurality of planetary gears 32 are installed and pivoted to the planetary frame 31 and each of the plurality of planetary gears is respectively engaged with the ring gear 33 and the sun gear 34. The ring gear 33 is connected to the transmission mechanism 16, and the sun gear 34 is connected to the second one-way clutch 12 and the motor 15.

The electric power part 40 is used to store electrical energy generated by the generator 14 and to supply electric power to the motor 15.

The switching part 50 is connected to the generator 14, the motor 15, and the electric power part 40. Electric power generated by the generator 14 can be switched by the switching part 50 to supply to at least one of the motor 15 and the electric power part 40.

In FIG. 1, presentation of the case 10 therein is mainly to show that the first one-way clutch 11 and the second one-way clutch 12 are fixed onto the case 10. Hence, only a partial shape of the case 10 is presented around fixed positions of the clutches 11, 12.

The transmission mechanism 16 may be a gear transmission mechanism. As shown in FIG. 2, the transmission mechanism 16 comprises a first gear 161, a second gear 162, and a third gear 163. The second gear 162 comprises a first tooth part 162A and a second tooth part 162B, and the first tooth part 162A and the second tooth part 162B are coaxial. The first gear 161 is connected to the ring gear 33 and is engaged with the first tooth part 162A of the second gear 162. The second tooth part 162B is engaged with the third gear 163. The third gear 163 is connected to the wheel 70.

Furthermore, when considering for motorcycle designs, the following three operating transmission modes are provided to explicitly explain the present invention. Since driving of the motor 15 and driving of the engine 13 are set in reverse directions. Hence, in order to avoid any confusion, a forward rotation of the motor 15, the planetary frame gear set 30 and the wheel 70 is set as a first rotation direction S1. A forward rotation of the engine 13 is a second rotation direction S2 (Referring to FIG. 1 for details).

Figure 3:
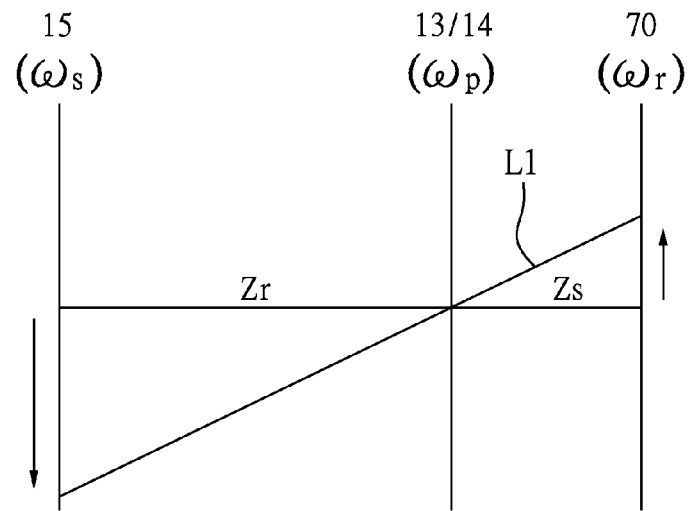
FIG. 3 shows a schematic diagram of a rotational velocity relationship of gears of a planetary gear frame set under a first mode thereof in accordance with the present invention.

[1] Low-speed electric mode. The motor 15 starts solely (The engine 13 is off at this moment), the motor 15 is set as backward rotation thereof, and the first one-way clutch 11 is locked. A rotational velocity relationship of the planetary gear frame set 30 is as shown in FIG. 3. When power is transmitted from the sun gear 34 to the plurality of planetary gears 32, the planetary frame 31 is stationary because the first one-way clutch 11 is locked, and thus the plurality of planetary gears 32 are consecutively driven by the sun gear 34 to rotate on the planetary frame 31 and drive the ring gear 33 to consecutively rotate. Finally, the power is transmitted to the transmission mechanism 16 to drive the wheel 70. It can be learned from FIGS. 1 and 2 that, when the first one-way clutch 11 is locked, the planetary frame 31 is stationary. When the motor 15 drives counterclockwise, an output of the wheel 70 is set to move forward (As an arrow in FIG. 1 is represented by the first rotation direction S1) to drive the motorcycle moving forward.

A speed reduction ratio of a rotational velocity transmitted from the motor 15 to the wheel 70 is:

$$\frac{\omega_M}{\omega_W} = \frac{\omega_M}{\omega_F} \times \frac{\omega_F}{\omega_W} = \gamma_P \times \gamma_f,$$

wherein, $$\frac{\omega_M}{\omega_F} = \frac{Z_r}{Z_s} = \gamma_P.$$

Wherein, $\omega_M$ is a rotational velocity of the motor 15;
$\omega_F$ is a rotational velocity of the transmission mechanism 16;
$\omega_W$ is a rotational velocity of the wheel 70;
$\gamma_f$ is a speed reduction ratio of the transmission mechanism 16;
$\gamma_p$ is a ratio of a tooth number of the ring gear 33 and a tooth number of the sun gear 34;
$Z_r$ is the tooth number of the ring gear 33
$Z_s$ is the tooth number of the sun gear 34;

As shown in FIG. 3, a first curve L1 is a rotational velocity relationship curve of the planetary gear frame set 30 in the low-speed electric mode. It can be learned from the first curve L1 that, when the first one-way clutch 11 is locked, the rotational velocity ($\omega_p$) of the planetary frame 31 is zero. The rotational velocity ($\omega_s$) of the sun gear 34 is a rotational velocity of backward rotation, and the rotational velocity ($\omega_r$) of the ring gear 33 is a rotational velocity of forward rotation.

In the low-speed electric mode, since the engine 13 does not start and can not drive the generator 14 to generate electricity, a power source of the motor 15 is completely provided by the electric power part 40.

[2] Medium and low speed switching mode. The generator 14 starts the engine 13, and then, the engine 13 (Forward rotation thereof) drives the linkage unit 20 and drives the generator 14 to generate electricity. By switching of the switching part 50, the generated electric power of the generator 14 is output to the motor 15 and the electric power part 40 to further drive the motor 15 to rotate forward and charge the electric power part 40. In this mode, the first one-way clutch 11 and the second one-way clutch 12 are set to limit unidirectional rotation of their connective devices, respectively, and the limited rotations of their connective devices are in the same direction. In other words, the first one-way clutch 11 and the second one-way clutch 12 allow only for rotations of the first rotation direction S1.

By driving of the engine 13, power is transmitted from the driving wheel group 22 to the passive wheel group 23, and such transmission results in a forward rotation of the planetary frame 31 to drive the ring gear 33 for forward rotation (The first rotation direction S1). Meanwhile, the motor 15 drives the sun gear 34 to rotate forward and further drive the plurality of planetary gears 32 for backward rotation. As a result, the rotational velocity of the ring gear 33 is reduced consequently. Finally, the ring gear 33 transmits power to the transmission mechanism 16 to further drive the wheels 70 for forward rotation and to allow motorcycles being driven normally (Rotation along the first rotation direction S1).

Figure 4:
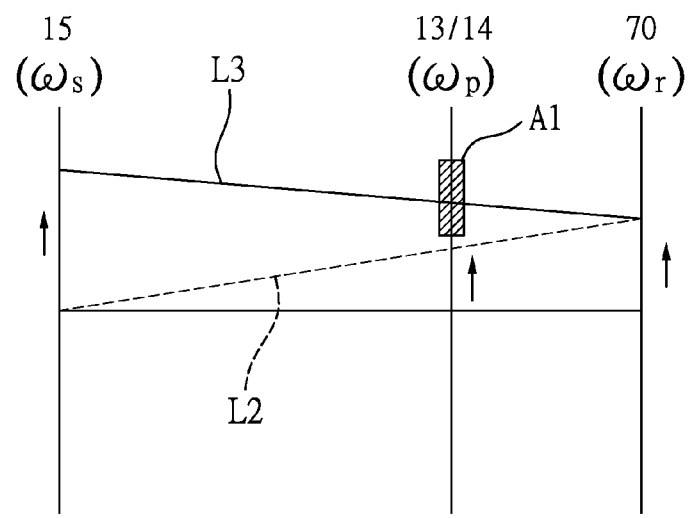
FIG. 4 shows a schematic diagram of a rotational velocity relationship of the gears of the planetary gear frame set under a second mode thereof in accordance with the present invention.
Figure 5:
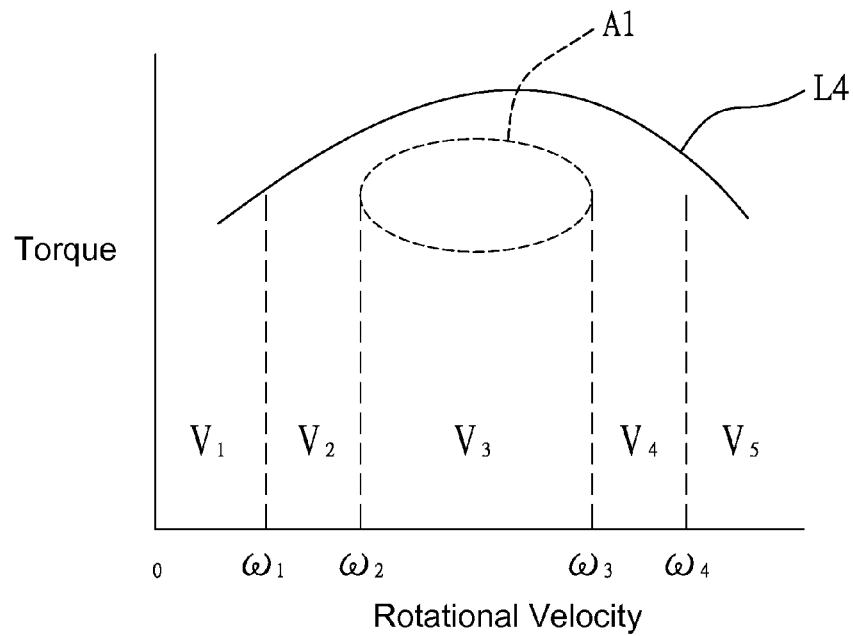
FIG. 5 shows a schematic diagram of a relationship between an engine torque and a rotational velocity when the system runs in a middle-speed, high-efficiency status in accordance with the present invention.

As shown in FIG. 4, when the rotational velocity of the engine 13 is within a range of a medium-speed and high-efficiency zone A1, a fuel economic benefit of the engine 13 is the best (Referring further to FIG. 5, a fourth curve L4 is a relationship curve of a rotational velocity and a torque. When the engine 13 is maintained to run in a medium-speed and high-efficiency zone A1, the fuel economic benefit generated by the engine 13 can reach its best). A second curve L2 in FIG. 4 is a rotational velocity relationship curve of ordinary motorcycles in the art to run in a medium and low speed status, and a third curve L3 is a rotational velocity relationship curve of the planetary gear frame set 30 of the present invention in its medium and low speed switching mode.

It can be learned from the second curve L2 and the third curve L3 that when ordinary motorcycles in the art runs at a medium and/or low speed, the rotational velocity of their wheels is driven at such medium and low speed only by the engine 13. However, the rotational velocity of the engine 13 of the ordinary motorcycles does not reach the ideal medium-speed and high-efficiency zone A1. In the present invention, the engine 13 and the motor 15 rotate forward at the same time when motorcycles of the present invention are at a medium and low speed. A rotational velocity of the engine 13 is hence increased to reach the ideal medium-speed and high-efficiency zone A1 due to simultaneously forward rotation of the engine 13 and the motor 15 so as to achieve a better fuel economic benefit. Furthermore, a final output rotational velocity is reduced by driving of forward rotation of the motor 15 in order to maintain a rotational velocity of the wheel 70 at the intended medium and low speed.

It can be further learned from the third curve L3 that the planetary frame 31 has a rotational velocity of forward rotation ($\omega_p$, driven by the engine 13). The ring gear 33 has a rotational velocity of forward rotation ($\omega_r$, used to drive the transmission mechanism 16 to move consecutively), and the sun gear 34 has a rotational velocity of forward rotation ($\omega_s$, driven by the motor 15).

A speed reduction ratio of a rotational velocity transmitted from the engine 13 to the wheel 70 is:

$$\frac{\omega_E}{\omega_W} = \frac{\omega_E}{\omega_G} \times \frac{\omega_G}{\omega_F} \times \frac{\omega_F}{\omega_W} = \gamma_{ch} \times \frac{\gamma_P}{\gamma_P + 1} \times \gamma_f,$$

wherein, a speed reduction ratio for a rotational velocity transmitted from the planetary gear frame set 30 to the transmission mechanism 16 is $$\frac{\omega_G}{\omega_F} = \frac{Z_r}{Z_r + Z_s} = \frac{\gamma_P}{\gamma_P + 1}.$$

$\gamma_{ch}$ is a speed reduction ratio of the linkage unit 20.

From the above descriptive explanation, it can be understood that, after switching the hybrid system of the present invention from the low-speed electric mode to the medium and low speed switching mode, electric power generated by the generator 14 is output to the electric power part 40 and the motor 15, and is used to further rapidly make up consumed electric power of the electric power part 40 during the low-speed electric mode and to increase the rotational velocity of the engine 13 to a medium speed thereof so as to make the rotational velocity of the engine 13 having the best fuel economic benefit as desired. Furthermore, an output rotational velocity to the wheel 70 is decelerated by the motor 15 to allow the wheel 70 reaching a desired rotational velocity.

In addition, in designs of the present invention, the engine 13 is maintained at a medium-speed and high-efficiency operation, and an output rotational velocity is reduced by power of forward rotation of the motor 15. Although such design will cause energy loss due to power neutralization during operations of the hybrid system, substantive interest gained from its fuel economic benefit achieving its best is considered as a whole to be worthily higher than the energy loss.

[3] Electronic continuously variable transmission (e-CVT) mode. When the hybrid system run at a medium and high speed (and at a high speed), electric power generated from the generator 14 is only output to the motor 15 by switching of the switching part 50 (No longer charging to the electric power part 40). The engine 13 rotates forward and the motor 15 rotates backward to add an output rotational velocity of the engine 13 and an output rotational velocity of the motor 15 to each other. In this mode, the first one-way clutch 11 and the second one-way clutch 12 are set to limit unidirectional rotation of their connective devices, respectively, and the limited rotations of their connective devices are in opposite directions (The first one-way clutch 11 allows only for rotations along the first rotation direction S1, and the second one-way clutch 12 allows otherwise). A rotational velocity relationship of the planetary gear frame set 30 is shown as FIG. 5.

Via driving of the engine 13 (The engine 13 rotates forward), power thereof is transmitted from the driving wheel group 22 to the passive wheel group 23 so that the planetary frame 31 rotates (Forward rotation) to drive rotation of the plurality of planetary gears 32 along the sun gear 34, and to further drive rotation of the ring gear 33. Finally, power is transmitted to the transmission mechanism 16 to drive the wheels 70 for forward rotation thereof. Meanwhile, power of the motor 15 due to backward rotation thereof is transmitted to the sun gear 34 to drive forward rotation of the plurality of planetary gears 32 and to accelerate forward rotation of the ring gear 33, and to further increase the rotational velocity of the wheels 70.

Figure 6:
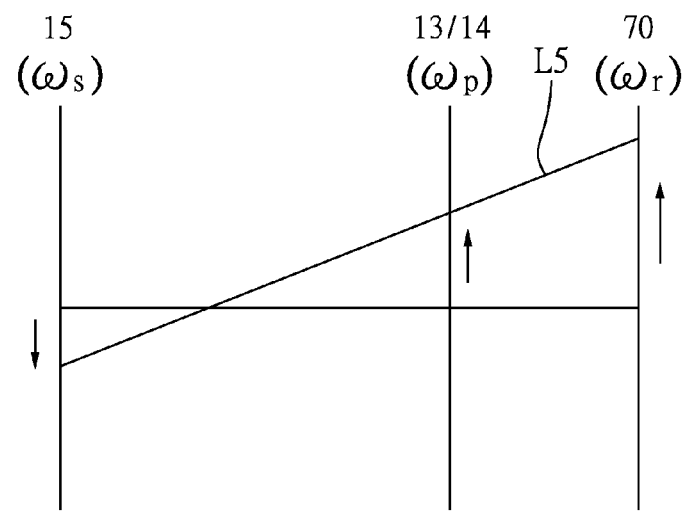
FIG. 6 shows a schematic flow diagram of a rotational velocity relationship of the gears of the planetary gear frame set under a third mode thereof in accordance with the present invention.

As shown in FIG. 6, a fifth curve L5 is representative to a rotational velocity relationship curve of the motor 15, the engine 13, and the wheel 70 in the e-CVT mode. It can be learned from the fifth curve L5 that the sun gear 34 is driven by the motor 15 and has a rotational velocity ($\omega_s$) of backward rotation of the sun gear 34. A rotational velocity ($\omega_p$) of the planetary frame 31 is a rotational velocity of forward rotation thereof, and a rotational velocity ($\omega_r$) of the ring gear 33 shows a linear increase (Its rotational velocity varies together with rotational velocity changes of the engine 13 and the motor 15).

In the e-CVT mode, the switching part 50 switches and outputs electric power generated by the generator 14 to the motor 15 so that the motor 15 runs by direct use of the electric power generated by the generator 14. In general, when a rotational velocity of the engine 13 is higher than velocities set in the medium-speed and high-efficiency zone A1, the system consumes more fuel. Accordingly, in the present invention, by simultaneous driving of the engine 13 and the motor 15 to add up their output rotational velocities at medium and high speed (or high speed), the rotational velocity of the engine 13 can be therefore reduced to lower fuel consumption thereof.

From the above descriptive explanation, the electric power part 40 (i.e., batteries) of the present invention only is charged and discharges respectively in the low-speed electric mode and the medium and low speed switching mode. At a medium-speed or higher (A normal traveling speed is generally a medium-speed or above), electric power of the motor 15 is directly supplied by the generator 14 after generation thereof. The electric power part 40 no longer proceeds to be charged and discharged, and therefore usage of the electric power part 40 (i.e., batteries) is effectively reduced to further increase a service life thereof. Since the usage of the electric power part 40, i.e., batteries, decreases, a volume thereof can be relatively reduced. Market acceptance will be improved under conditions of a high life and small size of batteries. Differences between the present invention and ordinary technology in the art can be learned from Table 1, FIG. 5, and following explanations.

A rotational velocity of a defined low-speed zone V1 in FIG. 5 is from zero to a first rotational velocity value $\omega_1$, a rotational velocity of a defined medium and low speed zone V2 is from the first rotational velocity value $\omega_1$ to a second rotational velocity value $\omega_2$, a rotational velocity of a defined medium-speed zone V3 is set from the second rotational velocity value $\omega_2$ to a third rotational velocity value $\omega_3$, a rotational velocity of a defined medium and high speed zone V4 is from the third rotational velocity value $\omega_3$ to a fourth rotational velocity value $\omega_4$, and a rotational velocity of a defined high speed zone V5 is set above the fourth rotational velocity value $\omega_4$. Preferably, the first rotational velocity value $\omega_1$ is 1,200 rpm, the second rotational velocity value $\omega_2$ is 2,400 rpm, the third rotational velocity value $\omega_3$ is 4,800 rpm, and the fourth rotational velocity value $\omega_4$ is 7,200 rpm. Additionally, it is assumed that a ratio of the rotational velocity of the engine 13 and the rotational velocity of the motor 15 driven by the generator 14 in accordance with the present invention is 5:1.

[a] Low-speed start. When the system starts at a low speed, the present invention is designed to be the same as general technology in the art to have the engine 13 turned off and to provide power for driving of the motor 15 only by electric power of the electric power part 40 (The electric power part 40 is a battery in the present invention).

[b] Medium and low speed, assuming that a rotational velocity output to the wheel 70 is 2,400 rpm.

For ordinary technology in the art, when a vehicle velocity reaches the defined medium and low speed, the electric power part of ordinary technology of the art no longer supplies electric power to a motor thereof. A wheel and a generator thereof are driven only by an engine thereof, and electric power produced by the generator continues to charge the battery thereof. Under the condition of being driven solely by the engine, the output rotational velocity of the engine is 2,400 rpm which is not fallen within the medium-speed high-efficiency zone A1 and fuel economic benefit performance thereof is poor.

For the present invention, when a vehicle velocity reaches the defined medium and low speed, the electric power part 40 of the present invention no longer supplies electric power to the motor 15, and the wheel 70 and the generator 14 are driven by the engine 13. Meanwhile, by switching of the switching part 50, electric power generated from the generator 14 is output to the electric power part 40 and the motor 15, respectively, to further charge the electric power part 40 and drive the motor 15 to rotate at the same time. Generally speaking, in the present invention, the engine 13 outputs 2,000 rpm for use, and the generator 14 drives forward rotation of the motor 15 to output 400 rpm (Based on the assumed setting ratio value of 5:1 to the rotational velocity of the engine 13). As a result, a total output to the wheel 70 is 2,000+400=2,400 rpm. However, an actual output of the engine 13 based on the previously depicted scenario is not correctly fallen within the medium-speed high-efficiency zone A1. Hence, in actual practice of the present invention, the rotational velocity of the engine 13 is controlled to be within the medium-speed high-efficiency zone A1 (Between 2,400-4,800 rpm as defined), for example, set as 3,000 rpm. The generator 14 further drives forward rotation of the motor 15 to output 600 rpm (Based on the assumed setting ratio value of 5:1 to the rotational velocity of the engine 13), and the total output to the wheel 70 is now 3,000−600 (The motor 15 rotates forward and its output is negative due to backward rotation output thereof)=2,400 rpm.

Therefore, the engine 13 of the present invention is maintained to run within the medium-speed high-efficiency zone A1 in order to achieve a better fuel economic benefit, and the motor 15 is controlled to rotate forward in order to achieve a required rotational velocity for the wheel 70.

[c] Medium speed, assuming that the rotational velocity output to the wheel 70 is 4,200 rpm.

For ordinary technology in the art, when the vehicle velocity reaches the defined medium speed, actions for the ordinary technology in the act are the same with actions for the medium and low speed as previously mentioned. The electric power part no longer supplies electric power to the motor, and the wheel and the generator are driven only by the engine thereof. Although the output rotational velocity of the engine is 4,200 rpm which is already fallen within the medium-speed high-efficiency zone A1 to achieve a better fuel economic benefit, electric power produced by the generator still continuously charges the electric power part of the art.

For the present invention, when the vehicle velocity reaches the defined medium speed, the electric power part 40 of the present invention no longer supplies electric power to the motor 15, and the wheel 70 and the generator 14 are driven by the engine 13. Meanwhile, by switching of the switching part 50, the generator 14 directly outputs its generated electric power to the motor 15 to drive the motor 15 for rotation. The rotational velocity of the engine 13 is controlled to be within the medium-speed high-efficiency zone A1 (Between 2,400-4,800 rpm as defined) in the present invention, for example, set as 3,500 rpm. The generator 14 further drives backward rotation of the motor 15 to output 700 rpm (Based on the assumed setting ratio of 5:1 to the rotational velocity of the engine 13), and the total output to the wheel 70 is 3,500+700 (The motor 15 rotates backward and its output is positive due to forward rotation output thereof)=4,200 rpm.

It can be learned that, although the engines 13 of the present invention and the engine of ordinary technology in the art are both maintained to run within the medium-speed high-efficiency zone A1 in order to achieve a better fuel economic benefit, electric power produced by the generator of ordinary technology in the art continuously charges the electric power part thereof. On the contrary, the rotational velocity of the engine 13 is controlled to be reduced in the present invention though the engine 13 is maintained to run in the medium-speed high-efficiency zone A1. Furthermore, electric power generated by the generator 14 is output to the motor 15, and the rotational velocities output from the engine 13 and the motor 15 are added up to reach the desired output rotational velocity for the wheel 70. In other words, electric power generated by the generator 14 is applied to the motor 15 instead of the electric power part 40 for charging.

[d] Medium and high speed, assuming that the rotational velocity output to the wheel 70 is 7,200 rpm.

For ordinary technology in the art, when the vehicle velocity reaches the defined medium and high speed, the wheel and the generator are driven only by the engine. The output rotational velocity of the engine is 7,200 rpm which already exceeds the medium-speed high-efficiency zone A1 and has a poor performance for fuel economic benefit. In the meantime, electric power produced by the generator still continuously charges the electric power part.

For the present invention, when the vehicle velocity reaches the defined medium and high speed, the wheel 70 and the generator 14 are driven by the engine 13. Furthermore, by switching of the switching part 50, electric power generated from the generator 14 is directly output to the motor 15 to further drive the motor 15 for rotation. The rotational velocity of the engine 13 is controlled as 6,000 rpm in the present invention, and the generator 14 further drives backward rotation of the motor 15 to output 1,200 rpm (Based on the assumed setting ratio value of 5:1 to the rotational velocity of the engine 13). The total output to the wheel 70 is 6,000+1,200 (The motor rotates backward and its output is positive due to forward rotation output thereof)=7,200 rpm.

As to high speed, difference between the present invention and the ordinary technology in the art is the same as depicted for the medium and high speed as previously mentioned.

It can be learned that, although the engines 13 of the present invention and the engine of the ordinary technology in the art both exceed the medium-speed high-efficiency zone A1, electric power produced by the generator of the ordinary technology in the art continuously charges the electric power part thereof. On the contrary, in the present invention, the rotational velocity of the engine 13 is controlled to be reduced and electric power generated by the generator 14 is further output to the motor 15. The rotational velocities output from the engine 13 and the motor 15 are added up to reach the desired output rotational velocity for the wheel 70. In other words, electric power generated by the generator 14 is applied to the motor 15 instead of the electric power part 40 for charging.

Understandably, the present invention not only has a better fuel economic benefit than the ordinary technology in the art when running in the medium and low speed zone V2, but also is able to have a longer life for the electric power part 40 thereof by characteristics of transferring electric power instead of continuously charging the electric power part 40 when running at medium speeds or higher. In addition, since batteries of the present invention (i.e., the electric power part 40) is only required to supply power thereof alone during the low-speed start period, the required volume thereof in design is relatively smaller, and has advantages of saving space and cost.

TABLE 1

Comparison Table for the Hybrid System of Ordinary Technology in the Art and the Hybrid System of the Present Invention

| | Ordinary Technology | The Present Invention |
|---|---|---|
| Low-Speed (Start) 0 to $\omega_1$ $\omega_1$ = 1200 rpm | [1] Engine (off) [2] Battery → Motor (on) | [1] Engine (off) [2] Battery → Motor (on) |
| Medium and Low Speed $\omega_1$ to $\omega_2$ $\omega_2$ = 2400 rpm | [1] Battery → Motor (off) [2] Engine (on) → Wheel and Genereator [3] Engine Output 2400 rpm → Not Fallen within the Medium-Speed High-Efficiency Zone → Battery Charging | [1] Battery → Motor (off) [2] Engine (on) → Wheel and Generator [3] Switching Part → Switch → Driving the Motor (Forward Rotation) → Battery Charging [4] Engine Output 3000 − Motor Output 600 = 2400 rpm; Engine Output 3000 rpm → within Medium-Speed High-Effciency Zone |
| Medium-Speed $\omega_2$ to $\omega_3$ (4800 rpm) | [1] Battery → Motor (off) [2] Engine (on) → Wheel and Genereator [3] Engine Output 4200 rpm → Medium-Speed High-Efficiency Zone → Battery Continuously Charging | [1] Battery → Motor (off) [2] Engine (on) → Wheel and Generator [3] Switching Part → Switch → Driving the Motor (Backward Rotation) → Battery Not Charging [4] Engine Output 3500 + Motor Output 700 = 4200 rpm |
| Medium High Speed | [1] Battery → Motor (off) [2] Engine (on) → Wheel and Genereator [3] Engine Output 4200 rpm → Not Fallen within the Medium-Speed High-Efficiency Zone → Battery Continuously Charging | [1] Battery → Motor (off) [2] Engine (on) → Wheel and Generator [3] Switching Part → Switch → Driving the Motor (Backward Rotation) → Battery Not Charging; [4] Engine Output 6000 + Motor Output 1200 = 7200 rpm |

In summary, effects and advantages of the present invention can be summarized as follows.

Extending a battery life and reducing a battery volume. Ordinary electric cars in their electric mode, electric power of the motor is supplied by batteries thereof completely. Therefore, when there are more frequent usages for the electric mode, the number of continuously charging and discharging of the batteries increases relatively to naturally cause a shorter battery life. Besides, in order to maintain a certain distance of driving, the batteries in design are also necessary to have an adequate electric quantity and such design results in relatively larger battery volumes. Under conditions of a shorter battery life and a larger battery volume, market acceptance to such design will be relatively low. In the present invention, when running at the medium-speed and higher, electric power of the motor 15 is supplied directly by the generator 14 after being generated from the generator 14. The electric power part 40 is no longer being charged and discharging so that usage of the electric power part 40 is effectively reduced and its service life is increased. In the meantime, because the usage of the electric power part 40 decreases, its volume can be relatively lowered, and market acceptance thereto is relatively raised under conditions of a high battery life and a small battery size.

[2] Enhancing overall fuel economic benefit. When ordinary hybrid motorcycles in the art are switched to its fuel-driving mode, the engine thereof individually drives, and the rotational velocity of the wheel changes together with the rotational velocity of the engine. Therefore, the engine varies its running together with the required speed of users and cannot be maintained to run under a medium-speed high-efficiency, and hence, its fuel economic benefit is lower. The engine 13 of the present invention is maintained to run at a rotational velocity of a medium-speed high-efficiency status, and the rotational velocity of the wheel 70 is adjustable by the engine 13 in cooperation with the rotational velocity of the motor 15. As a result, a generated fuel economic benefit will achieve its best.

What is claimed is:

1. An electric power split hybrid system, comprising:
a case;
a first one-way clutch fixed to the case and capable of being set in a locked state and in a disengaged state, respectively;
a second one-way clutch fixed to the case and capable of being set in a locked state and in a disengaged state, respectively;
an engine;
a generator used to start the engine, the generator further capable of adjusting a torque of the engine, and capable of generating electricity by driving of the engine after the engine starts;
a motor;
a transmission mechanism used to link and move a wheel to rotate;
a linkage unit comprising a transmission element, a driving wheel group, and a passive wheel group, the driving wheel group being connected to the engine, the transmission element used to link the driving wheel group and the passive wheel group to each other;
a planetary gear frame set comprising a planetary frame, a plurality of planetary gears, a ring gear, and a sun gear, the planetary frame being connected to the passive wheel group and the first one-way clutch, the plurality of planetary gears installed and pivoted to the planetary frame, and each of the plurality of planetary gears being respectively engaged with the ring gear and the sun gear, the ring gear being connected to the transmission mechanism, the sun gear being connected to the second one-way clutch and the motor;
an electric power part used to store electrical energy generated by the generator and to supply electric power to the motor; and
a switching part being connected to the generator, the motor, and the electric power part, electric power generated by the generator being switched by the switching part to supply to one of the motor and the electric power part.

2. The electric power split hybrid system as claimed in claim 1, wherein the transmission mechanism comprises a first gear, a second gear, and a third gear, the second gear comprises a first tooth part and a second tooth part, and the first tooth part and the second tooth part are coaxial, the first gear is connected to the ring gear and is engaged with the first tooth part of the second gear, the second tooth part of the second gear is engaged with the third gear, the third gear is connected to the wheel.

3. The electric power split hybrid system as claimed in claim 1, wherein the engine comprises a first linkage part and a second linkage part, and the second linkage part is connected to the generator and the driving wheel group, when the engine starts, the first linkage part is driven to further drive the second linkage part to rotate, and the second linkage part drives the generator connected thereto to generate electricity and drives the driving wheel group connected with the second linkage part to rotate.

* * * * *